(12) United States Patent
Huh et al.

(10) Patent No.: US 11,469,492 B2
(45) Date of Patent: Oct. 11, 2022

(54) FILM ANTENNA AND DISPLAY DEVICE INCLUDING THE SAME

(71) Applicants: DONGWOO FINE-CHEM CO., LTD., Jeollabuk-do (KR); POSTECH RESEARCH AND BUSINESS DEVELOPMENT FOUNDATION, Gyeongsangbuk-do (KR)

(72) Inventors: Yoon Ho Huh, Seoul (KR); Dong Pil Park, Incheon (KR); Yun Seok Oh, Gyeonggi-do (KR); Won Bin Hong, Seoul (KR)

(73) Assignees: DONGWOO FINE-CHEM CO., LTD., Jeollabuk-do (KR); POSTECH RESEARCH AND BUSINESS DEVELOPMENT FOUNDATION, Gyeongsangbuk-do (KR)

( * ) Notice: Subject to any disclaimer, the term of this patent is extended or adjusted under 35 U.S.C. 154(b) by 190 days.

(21) Appl. No.: 16/798,678

(22) Filed: Feb. 24, 2020

(65) Prior Publication Data
US 2020/0194880 A1 Jun. 18, 2020

Related U.S. Application Data

(63) Continuation of application No. PCT/KR2018/009691, filed on Aug. 23, 2018.

(30) Foreign Application Priority Data

Aug. 24, 2017 (KR) .......................... 10-2017-0107146

(51) Int. Cl.
*H01Q 1/38* (2006.01)
*H01Q 1/24* (2006.01)
(Continued)

(52) U.S. Cl.
CPC ............... *H01Q 1/38* (2013.01); *B32B 7/02* (2013.01); *H01Q 1/24* (2013.01); *H01Q 1/243* (2013.01);
(Continued)

(58) Field of Classification Search
CPC ............ H01Q 1/38; H01Q 1/24; H01Q 1/243; H01Q 1/40; H01Q 21/065; H01Q 9/0485; B32B 7/02
(Continued)

(56) References Cited

U.S. PATENT DOCUMENTS

2009/0109102 A1 4/2009 Dokai et al.
2010/0090902 A1* 4/2010 Thompson ........... H01Q 21/065
343/700 MS
(Continued)

FOREIGN PATENT DOCUMENTS

CN 101142715 A 3/2008
CN 102122756 A 7/2011
(Continued)

OTHER PUBLICATIONS

Office action dated Apr. 13, 2020 from Korean Patent Office in a counterpart Korean Patent Application No. 10-2017-0107146 (English translation is also submitted herewith.).
(Continued)

*Primary Examiner* — Hai V Tran
(74) *Attorney, Agent, or Firm* — The PL Law Group, PLLC

(57) ABSTRACT

A film antenna according to an embodiment of the present invention includes a dielectric layer, a first electrode on the dielectric layer, an insulation layer covering the first electrode, and a second electrode on the insulation layer to be electrically connected to the first electrode. The second electrode has a thickness different from that of the first
(Continued)

electrode and has a transmittance lower than that of the first electrode. The film antenna having high transmittance and providing high frequency operation may be provided by a construction of the first electrode and the second electrode.

14 Claims, 4 Drawing Sheets

(51) Int. Cl.
　　*B32B 7/02*　　　(2019.01)
　　*H01Q 9/04*　　　(2006.01)
　　*H01Q 1/40*　　　(2006.01)
　　*H01Q 21/06*　　 (2006.01)
(52) U.S. Cl.
　　CPC ............ *H01Q 1/40* (2013.01); *H01Q 9/0485* (2013.01); *H01Q 21/065* (2013.01)
(58) Field of Classification Search
　　USPC ........................................................ 343/908
　　See application file for complete search history.

(56) References Cited

U.S. PATENT DOCUMENTS

| | | | | |
|---|---|---|---|---|
| 2012/0229345 | A1* | 9/2012 | Takaki | H01Q 1/2291 343/700 MS |
| 2013/0222198 | A1* | 8/2013 | Kojima | H01Q 1/22 343/788 |
| 2016/0170540 | A1* | 6/2016 | Yang | G02B 1/14 345/173 |
| 2016/0190678 | A1* | 6/2016 | Hong | H01Q 1/273 343/700 MS |
| 2016/0283025 | A1* | 9/2016 | Yang | G02B 1/14 |
| 2016/0299630 | A1* | 10/2016 | Park | G06F 3/044 |
| 2016/0299631 | A1* | 10/2016 | Lee | G06F 3/0443 |
| 2017/0309995 | A1* | 10/2017 | Kim | H01Q 3/24 |
| 2018/0314120 | A1* | 11/2018 | Peng | G06F 3/0412 |

FOREIGN PATENT DOCUMENTS

| | | |
|---|---|---|
| CN | 103503276 A | 1/2014 |
| CN | 203850428 U | 9/2014 |
| CN | 104953262 A | 9/2015 |
| CN | 106104915 A | 11/2016 |
| EP | 0 911 906 A2 | 4/1999 |
| JP | 2006-294006 A | 10/2006 |
| JP | 2014-095742 A | 5/2014 |
| JP | 2016-224815 A | 12/2016 |
| JP | 2017-10154 A | 1/2017 |
| KR | 10-2002-0041769 A | 6/2002 |
| KR | 10-2003-0013739 A | 2/2003 |
| KR | 10-2003-0095557 A | 12/2003 |
| KR | 10-2008-0002909 A | 1/2008 |
| KR | 10-2010-0113258 A | 10/2010 |
| KR | 10-2014-0103761 A | 8/2014 |
| KR | 10-2015-0071495 A | 6/2015 |
| KR | 10-2016-0011436 A | 2/2016 |
| KR | 10-2016-0080444 A | 7/2016 |
| KR | 10-2017-0089198 A | 8/2017 |
| WO | WO 2013/154713 A1 | 10/2013 |

OTHER PUBLICATIONS

International Search Report for PCT/KR2018/009691 dated Dec. 3, 2018.

* cited by examiner

# FILM ANTENNA AND DISPLAY DEVICE INCLUDING THE SAME

CROSS REFERENCE TO RELATED APPLICATIONS AND CLAIM OF PRIORITY

The present application is a continuation application to International Application No. PCT/KR2018/009691 with an International Filing Date of Aug. 23, 2018, which claims the benefit of Korean Patent Application No. 10-2017-0107146 filed on Aug. 24, 2017 at the Korean Intellectual Property Office, the disclosures of which are incorporated by reference herein in their entirety.

BACKGROUND

1. Field

The present invention relates to a film antenna and a display device including the same. More particularly, the present invention relates to a film antenna including an electrode and a dielectric layer, and a display device including the same.

2. Description of the Related Art

As information technologies have been developed, a wireless communication technology such as Wi-Fi, Bluetooth, etc., is combined with a display device in, e.g., a smartphone form. In this case, an antenna may be combined with the display device to provide a communication function.

As mobile communication technologies have been rapidly developed, an antenna capable of operating an ultra-high frequency communication is needed in the display device. Further, as thin-layered display devices with high transparency and resolution such as a transparent display device, a flexible display device, etc., have been developed recently, the antenna having improved transparent and flexible properties is also required.

For example, when a transparent conductive oxide electrode such as an ITO electrode is used for applying an antenna structure in the display device, a transmittance may be improved, but a signal loss may be caused due to a resistance increase. When the antenna structure is applied to the flexible display device, electrode damages may occur when being folded or bent. Additionally, as the display device becomes lighter and thinner, a thickness and a volume of the antenna structure are also reduced to cause deterioration of an electrode sensitivity and resistance.

Therefore, developments of an antenna having low resistance and high sensitivity while not degrading display quality and mechanical property of the display device are needed.

SUMMARY

According to an aspect of the present invention, there is provided a film antenna having improved electrical and optical properties.

According to an aspect of the present invention, there is provided a display device including a film antenna having improved electrical and optical properties.

The above aspects of the present invention may be achieved by one or more of the following features or constructions:

(1) A film antenna including: a dielectric layer; a first electrode on the dielectric layer; an insulation layer covering the first electrode; and a second electrode on the insulation layer to be electrically connected to the first electrode, the second electrode having a thickness different from that of the first electrode and having a transmittance lower than that of the first electrode.

(2) The film antenna according to the above (1), wherein the first electrode and the second electrode are formed of silver (Ag), gold (Au), copper (Cu), aluminum (Al), platinum (Pt), palladium (Pd), chromium (Cr), titanium (Ti), tungsten (W), niobium (Nb), tantalum (Ta), vanadium (V), iron (Fe), manganese (Mn), cobalt (Co), nickel (Ni), zinc (Zn), molybdenum (Mo), calcium (Ca) or an alloy thereof.

(3) The film antenna according to the above (2), wherein the first electrode and the second electrode are formed of silver or a silver-palladium-copper (APC) alloy.

(4) The film antenna according to the above (2), wherein the first electrode and the second electrode are formed of copper or a copper-calcium (Cu—Ca) alloy.

(5) The film antenna according to the above (2), wherein the first electrode and the second electrode have a solid pattern structure, wherein a thickness of the first electrode is in a range from 80 Å to 200 Å and a transmittance of the first electrode is 70% or more, wherein a thickness of the second electrode is in a range from 350 Å to 5000 Å and a transmittance of the second electrode is 10% or less.

(6) The film antenna according to the above (2), wherein the first electrode has a mesh-type structure and the second electrode has a solid pattern structure.

(7) The film antenna according to the above (6), wherein a thickness of the first electrode is in a range from 1500 Å to 5000 Å and a transmittance of the first electrode is 70% or more, wherein a thickness of the second electrode is in a range from 350 Å to 5000 Å and a transmittance of the second electrode is 10% or less.

(8) The film antenna according to the above (6), further including a dummy mesh layer formed around the first electrode.

(9) The film antenna according to the above (1), further including a via structure formed in the insulation layer to electrically connect the first electrode and the second electrode.

(10) The film antenna according to the above (1), wherein the first electrode is disposed in a display region of a display device, and the second electrode is disposed in a peripheral region of the display device.

(11) The film antenna according to the above (1), wherein the first electrode includes an antenna array electrode and a transmission line.

(12) The film antenna according to the above (11), wherein the second electrode includes a driving electrode or a pad electrode.

(13) The film antenna according to the above (12), wherein the second electrode is electrically connected to the transmission line included in the first electrode.

(14) The film antenna according to the above (1), wherein a transmittance of the second electrode is 0 (zero).

(15) A display device including the film antenna according to any one of the above (1) to (14).

A film antenna according to exemplary embodiments of the present invention may include a first electrode and a second electrode having different thicknesses, transmittances and/or pattern shapes from each other. Thus, desired electrical and optical properties may be implemented selectively according to an electrode arrangement region.

In exemplary embodiments, the first electrode may be disposed in a display region of a display device and may have high transmittance and flexible properties. The second electrode may be disposed in a peripheral region of the display device, and may have low resistance and high sensitivity to suppress a signal loss through the film antenna.

In exemplary embodiments, the first electrode and the second electrode may be disposed at different levels or at different layers, and may be electrically connected to each other by a via structure. Thus, desired electrical or optical characteristics can be differentiated and easily implemented, and a desired dielectric constant can be obtained by an insulation layer.

The film antenna may be effectively applied to a flexible display device to improve optical, electrical and mechanical properties of the flexible display device.

DETAILED DESCRIPTION OF THE EMBODIMENTS

According to exemplary embodiments of the present invention, there is a provided a film antenna which includes a first electrode on a dielectric layer, an insulation layer on the first electrode, and a second electrode on the insulation layer to be electrically connected to the first electrode. The second electrode may have a different thickness from that of the first electrode and a lower transmittance than that of the first electrode.

The film antenna may be, e.g., a microstrip patch antenna fabricated as a transparent film. The film antenna may be applied to, e.g., a communication device for high frequency or ultra-high frequency (for example, 3G, 4G, 5G or more) mobile communications.

According to exemplary embodiments of the present invention, a display device including the film antenna is also provided.

Hereinafter, the present invention will be described in detail with reference to the accompanying drawings. However, those skilled in the art will appreciate that such embodiments described with reference to the accompanying drawings are provided to further understand the spirit of the present invention and do not limit subject matters to be protected as disclosed in the detailed description and appended claims.

Figure 1:
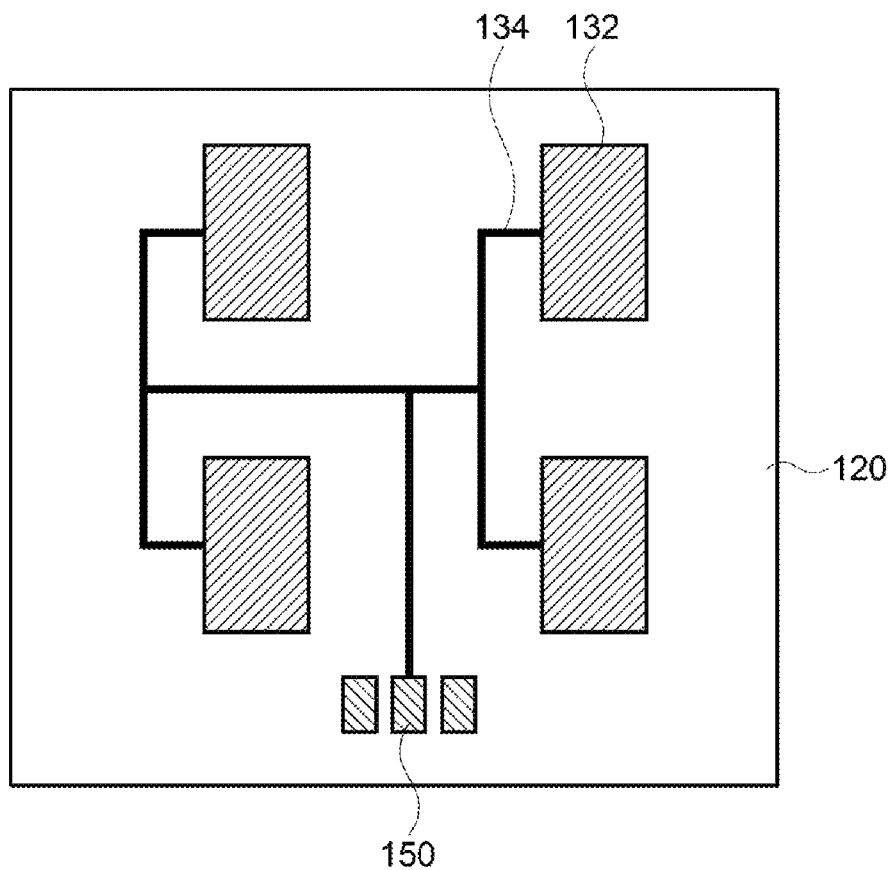
FIG. 1 is a schematic top planar view illustrating a film antenna in accordance with exemplary embodiments.
Figure 2:
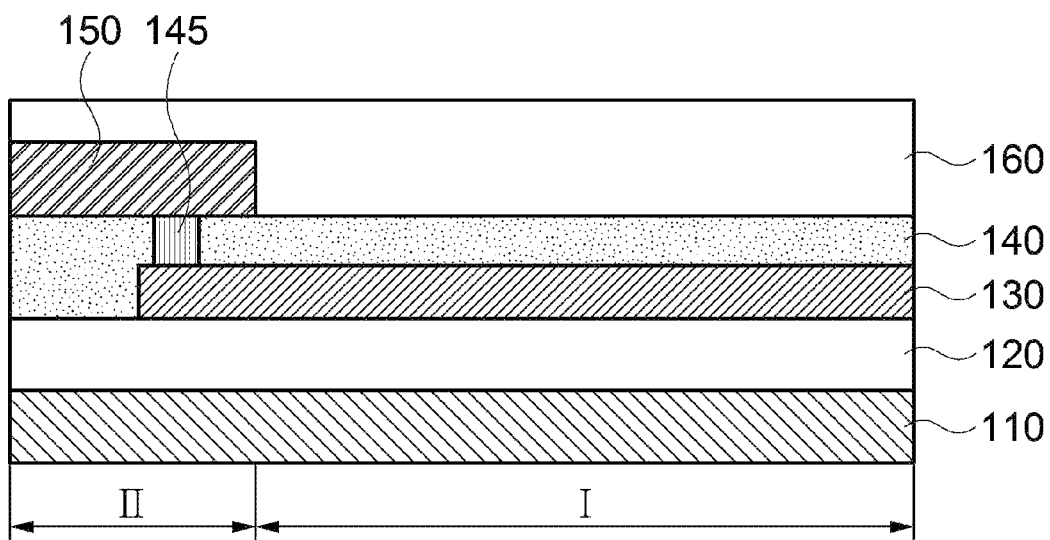
FIG. 2 is a schematic cross-sectional view illustrating a film antenna in accordance with exemplary embodiments.

FIG. 1 is a schematic top planar view illustrating a film antenna in accordance with exemplary embodiments. FIG. 2 is a schematic cross-sectional view illustrating a film antenna in accordance with exemplary embodiments.

Referring to FIGS. 1 and 2, a film antenna 100 according to exemplary embodiments may include a dielectric layer 120, a first electrode 130, and a second electrode 150.

The dielectric layer 120 may include an insulation material having a predetermined dielectric constant. The dielectric layer 120 may include, e.g., an inorganic insulation material such as silicon oxide, silicon nitride, a metal oxide, etc., or an organic insulation material such as an epoxy resin, an acrylic resin, an imide-based resin, etc. The dielectric layer 120 may function as a film substrate of the film antenna 100.

In some embodiments, the dielectric layer 120 may be disposed on a ground layer 110. The ground layer 110 may include a conductive material such as a metal, an alloy, a transparent metal oxide, or the like. In an embodiment, various conductive members of a communication device or a display device to which the film antenna 100 is applied may serve as the ground layer 110.

The first electrode 130 may be formed on an upper surface of the dielectric layer 120. In exemplary embodiments, the first electrode 130 may include a metal or an alloy. In some embodiments, the first electrode 130 may not include a transparent metal oxide such as, e.g., indium tin oxide (ITO) or indium zinc oxide (IZO).

For example, the first electrode 130 may include silver (Ag), gold (Au), copper (Cu), aluminum (Al), platinum (Pt), palladium (Pd), chromium (Cr), titanium (Ti), tungsten (W), niobium (Nb), tantalum (Ta), vanadium (V), iron (Fe), manganese (Mn), cobalt (Co), nickel (Ni), zinc (Zn), molybdenum (Mo), calcium (Ca) or an alloy thereof. These may be used alone or in a combination thereof.

In some embodiments, the first electrode 130 may include silver or a silver alloy to have a low resistance. For example, the first electrode 130 may include a silver-palladium-copper (APC) alloy.

In an embodiment, the first electrode 130 may include copper (Cu) or a copper alloy in consideration of low resistance and pattern formation with a fine line width. For example, the first electrode 130 may include a copper-calcium (Cu—Ca) alloy.

In exemplary embodiments, the first electrode 130 may serve as an antenna array electrode or a radiation electrode included in the film antenna 100. As illustrated in FIG. 2, the film antenna 100 or the dielectric layer 120 may be divided into a first region I and a second region II, and the first electrode 130 may be disposed on a portion of the dielectric layer 120 of the first region I. In an embodiment, the first electrode 130 may partially extend on the second region II.

When the film antenna 100 is applied to a display device, the first region I may correspond to a display region where an image is implemented in the display device. The second region II may correspond to a peripheral region (e.g., a bezel region) of the display device.

The first electrode 130 may be disposed in the display region, and thus may be formed to have a high transmittance to prevent from being visually recognized by a user. In exemplary embodiments, the transmittance of the first electrode 130 may be about 70% or more. In an embodiment, the transmittance of the first electrode 130 may be about 85% or more.

In a comparative embodiment, an antenna array disposed in the display region generally includes a transparent metal oxide electrode such as an ITO electrode for enhancing transmittance. However, the transparent metal oxide electrode has an electrical resistance greater than a metal or an alloy electrode, and thus may not provide sufficient antennal operation or radiation properties in a high frequency antenna such as antennas for 3G or more communications.

However, according to exemplary embodiments, the first electrode 130 may be formed of an alloy such as APC or Cu—Ca, or a low resistance metal such as silver, so that a sufficient antenna operation performance may be realized even in a high frequency band corresponding to a 5G communication.

In some embodiments, the first electrode 130 may be formed as a thin film electrode (thin film solid electrode) to obtain the above-described transmittance. In this case, a thickness of the first electrode 130 may be in a range from about 80 Å to about 200 Å. In an embodiment, the thickness of the first electrode 130 may be formed in a range from about 80 Å to about 150 Å to further improve the transmittance.

In some embodiments, the thickness of the first electrode 130 may be relatively increased to implement a low resistance and improve a signal transmission, and may be patterned as a mesh-type electrode to enhance the transmittance. In this case, the thickness of the first electrode 130 may have a thickness in a range from about 1500 Å to 5000 Å. A line width of the mesh type electrode may be, e.g., from about 1 μm to 10 μm in consideration of the low resistance and the transmittance (e.g., achieving the transmittance of about 70% or more).

As illustrated in FIG. 1, the first electrode 130 may include an antenna array electrode 132 and a transmission line 134. The antenna array electrode 132 and the transmission line 134 may be disposed at the same layer or the same level.

The insulation layer 140 may be formed on the dielectric layer 120 to cover the first electrode 130. The insulation layer 140 may be formed commonly on the first region I and the second region II. The insulation layer 140 may include the above-described inorganic insulating material and/or organic insulating material.

The second electrode 150 may be disposed on an upper surface of the insulation layer 140. In exemplary embodiments, the second electrode 150 may be disposed selectively on the second region II. In an embodiment, a terminal end of the second electrode 150 may partially extend on the first region I.

The second electrode 150 may serve as a driving electrode or a pad electrode of the film antenna 100. Accordingly, the second electrode 150 may be formed to have more reduced resistance for implementing a high-frequency sensing or antenna driving. Further, the second electrode 150 may be positioned at, e.g., a peripheral region or a bezel portion of the display device, and thus the second electrode 150 may be formed to have a substantially low transmittance.

Thus, the second electrode 150 may be formed of a low resistance meal such as silver or an alloy such as APC or Cu—Ca, and may have a transmittance of, e.g., about 10% or less.

In some embodiments, the second electrode 150 may have a thick-layered solid electrode (non-mesh type) structure, and may have a thickness from about 350 Å to about 5,000 Å. If the thickness of the second electrode 150 may be less than about 350 Å, a desired target signal transmission coefficient may not be obtained. If the thickness of the second electrode 150 may exceed about 5,000 Å, a thin-type antenna device may not be easily obtained and a process issue may be caused. Additionally, a signal transmission effect by an increase of the thickness may not be further improved.

In an embodiment, the transmittance of the second electrode 150 may be substantially 0 (zero).

As illustrated in FIG. 2, the first electrode 130 and the second electrode 150 may be disposed at different layers or at different levels, and may be electrically connected to each other by a via structure 145. For example, an end portion of the transmission line 134 of the first electrode 130 and the second electrode 150 may be electrically connected to each other by the via structure 145.

In exemplary embodiments, a contact hole may be formed in the insulation layer 140 to partially expose a top surface of the first electrode 130. A metal layer or an alloy layer filling the contact hole may be formed, and then patterned to form the via structure 145. In some embodiments, the via structure 145 and the second electrode 150 may be provided as a single member substantially integrally connected to each other. In this case, the via structure 145 and the second electrode 150 may be formed by the same patterning process of the metal layer or the alloy layer.

As describe above, the first electrode 130 and the second electrode 150 which may have different desirable electrical and optical properties and may be formed at different regions may be electrically connected by the via structure 145. Thus, the film antenna 100 may be applied to a display device that may require high transmittance and high frequency-band operation.

A passivation layer 160 may be formed on the insulation layer 140 to cover the second electrode 150. The passivation layer 160 may be commonly formed on the first region I and the second region II. The passivation layer 160 may include an inorganic insulation material and/or an organic insulation material as described above.

Figure 3:
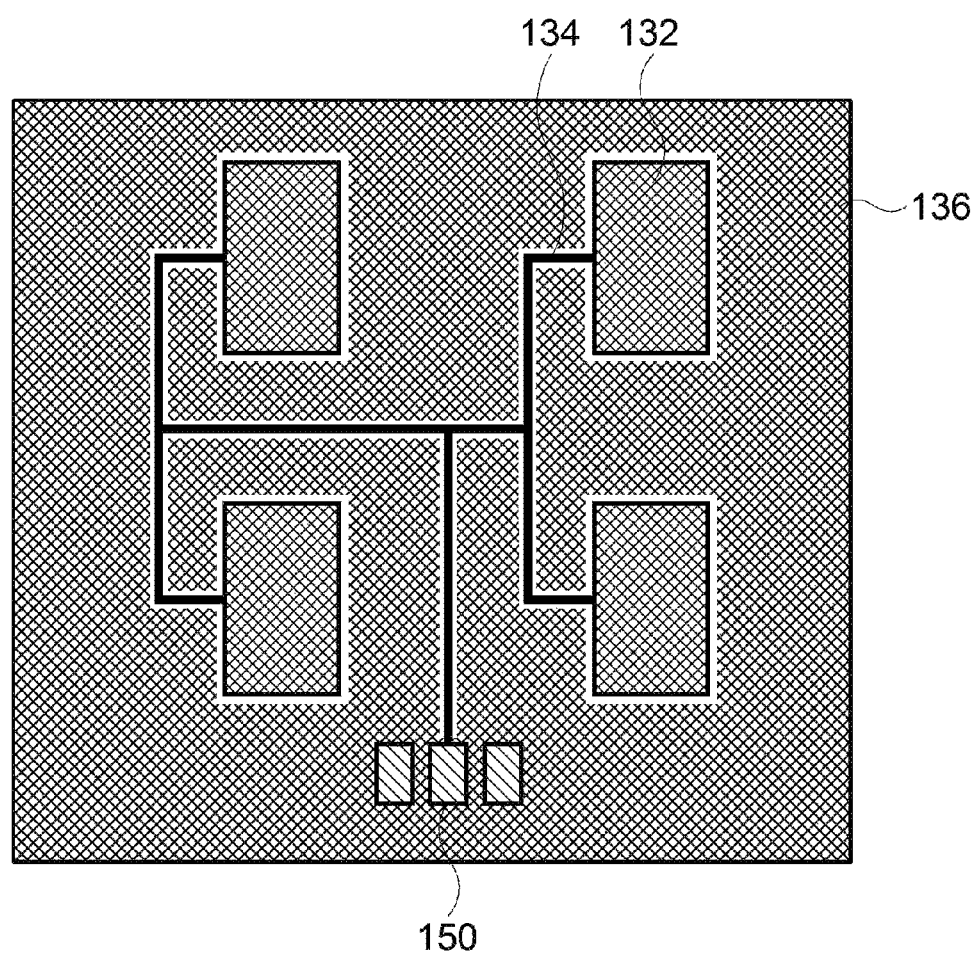
FIG. 3 is a schematic top planar view illustrating a film antenna in accordance with some exemplary embodiments.

FIG. 3 is a schematic top planar view illustrating a film antenna in accordance with some exemplary embodiments.

Referring to FIG. 3, the antenna array electrode 132 of a film antenna 101 may be formed as a mesh-type electrode, and a dummy mesh layer 136 may be formed around the antenna array electrode 132. In exemplary embodiments, the dummy mesh layer 136 may be formed on the dielectric layer 120, and may be physically and electrically separated from the antenna array electrode 132 and the transmission line 134.

The dummy mesh layer 136 may include a mesh pattern that may be substantially the same as or similar to that of the antenna array electrode 132. As the dummy mesh layer 136 is included, a pattern shape variation of each region may be averaged or reduced to prevent the antenna array electrode 132 from being recognized by, e.g., the user of the display device.

In exemplary embodiments, the dummy mesh layer 136 may be formed commonly on the first region I and the second region II illustrated in FIG. 2, and may be patterned to be separated and spaced apart from the antenna array electrode 132 and the transmission line 134.

Figure 4:
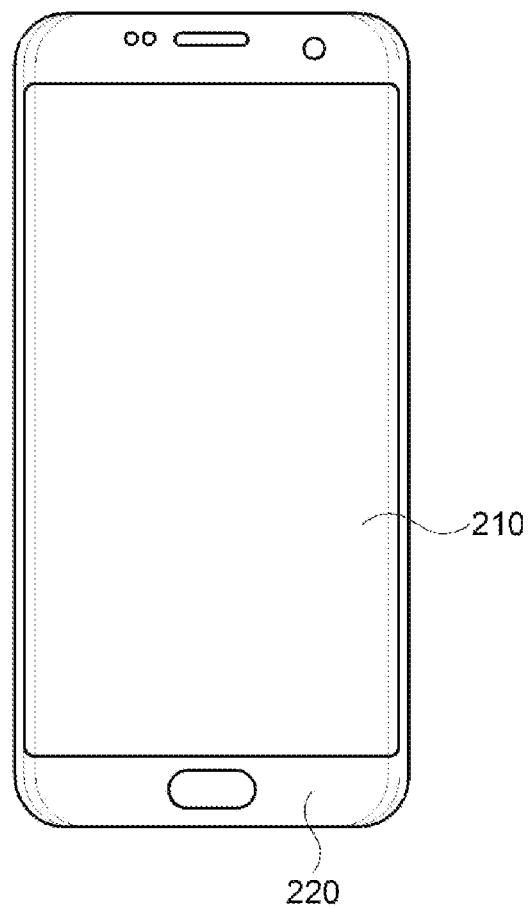
FIG. 4 is a schematic top planar view illustrating a display device in accordance with exemplary embodiments.

FIG. 4 is a schematic top planar view illustrating a display device in accordance with exemplary embodiments. For example, FIG. 4 illustrates an outer shape including a window of a display device.

Referring to FIG. 4, a display device 200 may include a display region 210 and a peripheral region 220.

In exemplary embodiments, the first region I and the second region II of the film antenna 100 may correspond to the display region 210 and the peripheral region 220 of the display device 200, respectively. The peripheral region 220 may correspond to, e.g., a light-shielding portion or a bezel portion of the display device.

Thus, the first electrode 130 of the film antenna 100 may be disposed on the display region 210 to implement high transmittance, and the second electrode 150 of the film antenna 100 may be disposed on the peripheral region 220 so that low resistance and high signal transmission efficiency may be provided.

In an embodiment, the display device 200 may be a flexible display having a flexibility. When the first electrode 130 is formed as a thin-layered metal electrode, the film antenna 100 according to exemplary embodiments may be effectively applied to the flexible display.

Table 1 shows signal transmission coefficient and transmittance values depending on a thickness of an electrode (having a solid pattern structure) formed of an APC alloy.

TABLE 1

| Thickness (Å) | Signal Transmission Coefficient (S21, dB) | Transmittance (%) |
|---|---|---|
| 50 | −11.09 | 98% |
| 80 | −7.19 | 93% |
| 100 | −5.85 | 90% |
| 150 | −4.03 | 85% |
| 200 | −3.09 | 75% |
| 350 | −1.84 | 10% |
| 700 | −0.97 | 5% |
| 1000 | −0.70 | 0% |
| 2000 | −0.37 | 0% |
| 3000 | −0.25 | 0% |
| 4000 | −0.20 | 0% |
| 5000 | −0.16 | 0% |

Referring to Table 1, a target signal transmission coefficient value for a high frequency communication may be set as about −1.2 Db, and thus a thickness of the second electrode 150 serving as a driving electrode or an input electrode may be set in a range from about 350 Å to about 5000 Å.

When a minimum transmittance in the display region is set as about 70%, an upper limit of the thickness of the first electrode 130 may be set as about 200 Å. When the thickness of the first electrode 130 is less than about 80 Å, a signal transmission property may be excessively degraded to deteriorate an antenna radiation property.

As described above, positions and thicknesses of the first electrode 130 and the second electrode 150 may be set to be suitable for each required transmittance and signal transfer properties so that the film antenna according to exemplary embodiment may be effectively applied to a display device having high frequency and high transmittance properties.

What is claimed is:

1. A film antenna, comprising:
a dielectric layer;
a first electrode including a radiation electrode on a top surface of the dielectric layer;
an insulation layer formed on the top surface of the dielectric layer to cover the first electrode;
a via structure formed in the insulation layer; and
a second electrode on a top surface of the insulation layer to be electrically connected to the first electrode by the via structure at a different level from that of the first electrode, the second electrode having a thickness different from that of the first electrode and having a transmittance lower than that of the first electrode.

2. The film antenna according to claim 1, wherein the first electrode and the second electrode are formed of at least one selected from the group consisting of silver (Ag), gold (Au), copper (Cu), aluminum (Al), platinum (Pt), palladium (Pd), chromium (Cr), titanium (Ti), tungsten (W), niobium (Nb), tantalum (Ta), vanadium (V), iron (Fe), manganese (Mn), cobalt (Co), nickel (Ni), zinc (Zn), molybdenum (Mo), calcium (Ca), and an alloy thereof.

3. The film antenna according to claim 2, wherein the first electrode and the second electrode are formed of at least one of silver and a silver-palladium-copper (APC) alloy.

4. The film antenna according to claim 2, wherein the first electrode and the second electrode are formed of at least one of copper and a copper-calcium (Cu—Ca) alloy.

5. The film antenna according to claim 2, wherein the first electrode and the second electrode have a solid pattern structure;
a thickness of the first electrode is in a range from 80 Å to 200 Å and a transmittance of the first electrode is 70% or more; and
a thickness of the second electrode is in a range from 350 Å to 5,000 Å and a transmittance of the second electrode is 10% or less.

6. The film antenna according to claim 2, wherein the first electrode has a mesh-type structure, and the second electrode has a solid pattern structure.

7. The film antenna according to claim 6, wherein a thickness of the first electrode is in a range from 1,500 Å to 5,000 Å, and a transmittance of the first electrode is 70% or more; and
a thickness of the second electrode is in a range from 350 Å to 5,000 Å, and a transmittance of the second electrode is 10% or less.

8. The film antenna according to claim 6, further comprising a dummy mesh layer formed around the first electrode.

9. The film antenna according to claim 1, wherein the first electrode includes an antenna array electrode including the radiation electrode, and a transmission line.

10. The film antenna according to claim 9, wherein the second electrode includes a driving electrode or a pad electrode.

11. The film antenna according to claim 10, wherein the second electrode is electrically connected to the transmission line included in the first electrode.

12. The film antenna according to claim 1, wherein a transmittance of the second electrode is 0 (zero).

13. A display device comprising the film antenna according to claim 1.

14. The display device of claim 13, wherein the display device has a display region and a peripheral region, and the first electrode is disposed in the display region, and the second electrode is disposed in the peripheral region.

* * * * *